United States Patent [19]
Blumenau

[11] Patent Number: 6,029,231
[45] Date of Patent: *Feb. 22, 2000

[54] RETRIEVAL OF DATA STORED ON REDUNDANT DISKS ACROSS A NETWORK USING REMOTE PROCEDURE CALLS

[75] Inventor: Steven M. Blumenau, Holliston, Mass.

[73] Assignee: EMC Corporation, Hopkinton, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,122

[22] Filed: Dec. 3, 1996

[51] Int. Cl.$^7$ ...................................................... G06F 11/16
[52] U.S. Cl. ........................ 711/162; 709/304; 709/217; 709/218; 709/219; 714/6
[58] Field of Search ........................ 395/200.47, 200.48, 395/200.49, 182.03, 182.04, 200.3, 182.05, 182.08, 182.09, 185.07; 371/10.2; 709/304

[56] References Cited

U.S. PATENT DOCUMENTS

| | | | |
|---|---|---|---|
| 3,623,014 | 11/1971 | Doelz et al. ................................ | 714/6 |
| 4,982,324 | 1/1991 | McConaughy et al. ................ | 709/222 |
| 5,146,561 | 9/1992 | Carey et al. ............................ | 709/200 |
| 5,235,601 | 8/1993 | Stallmo et al. . | |
| 5,305,438 | 4/1994 | MacKay et al. . | |
| 5,337,414 | 8/1994 | Hashemi et al. . | |
| 5,390,187 | 2/1995 | Stallmo . | |
| 5,398,253 | 3/1995 | Gordon . | |
| 5,435,004 | 7/1995 | Cox et al. . | |
| 5,463,772 | 10/1995 | Thompson et al. . | |
| 5,488,731 | 1/1996 | Mendelsohn ............................ | 711/114 |
| 5,495,607 | 2/1996 | Pisello et al. . | |
| 5,497,457 | 3/1996 | Ford . | |
| 5,499,337 | 3/1996 | Gordon . | |
| 5,504,858 | 4/1996 | Ellis et al. . | |
| 5,537,533 | 7/1996 | Staheli et al. ................................ | 714/5 |
| 5,544,347 | 8/1996 | Yanai et al. ............................. | 711/162 |
| 5,649,196 | 7/1997 | Woodhill et al. ....................... | 707/204 |
| 5,673,381 | 9/1997 | Huai et al. ................................. | 714/1 |
| 5,699,503 | 12/1997 | Bolosky et al. ........................... | 714/6 |
| 5,768,623 | 6/1998 | Judd et al. ................................ | 710/37 |

*Primary Examiner*—B. James Peikari
*Attorney, Agent, or Firm*—Fish & Richardson P.C.

[57] ABSTRACT

A host computer including an interpreter that maps logical user write requests to physical block level write requests, a host storage driver having a disk driver interface for receiving block level write requests, a host storage disk connected to be controlled by disk control signals of the host storage driver, and a redundant disk system having a disk driver interface to the interpreter and a remote procedure call interface to one or more associated computers connected to the host computer over a network, the redundant disk system sending write requests and data to be written from the interpreter to the host storage driver and to at least one of the other computers connected to the network.

17 Claims, 6 Drawing Sheets

REMOTE DISK SYSTEM

FIG. 5a
REDUNDANT DISK DRIVER

FIG. 5b

RETRIEVAL OF DATA STORED ON REDUNDANT DISKS ACROSS A NETWORK USING REMOTE PROCEDURE CALLS

CROSS REFERENCE TO RELATED APPLICATIONS

Patent applications entitled "Restoration of Data Backed up on Archive Media", "Backing up Computer Data", "Mirroring Computer Data", and "Hierarchical Performance System" filed by me concurrently herewith, are incorporated herein by reference.

BACKGROUND OF THE INVENTION

The invention relates to redundant storage for data stored on a host computer disk.

One way to automatically provide redundant storage of computer data is by mirroring. It is known to implement mirroring on a desk top computer by having a disk driver that does all writes to two disks which thus have identical images of the stored data. If one disk fails, the complete image of the data on the other disk can be accessed.

SUMMARY OF THE INVENTION

In one aspect, the invention features, in general, a host computer having capabilities for redundant storage of computer data. The computer is connected to a network and includes the usual components of an interpreter (e.g., a file system or a database application that does physical to logical mapping), a host storage disk, and a host storage driver for the host storage disk. In addition the computer includes a redundant disk system having a disk driver interface to the interpreter and a remote procedure call interface to one or more associated computers connected to a network. The redundant disk system sends the write requests and the data to be written from the interpreter to the host storage driver and an associated computer for redundant storage of the data on the associated computer.

In another aspect, the invention features, in general, a host computer having capabilities for redundant storage of computer data. The computer is connected to a network and includes an interpreter, a host storage disk, a host storage driver, and a redundant disk system having a disk driver interface to the interpreter and a remote procedure call interface to one or more associated computers connected to a network. The redundant disk system sends write requests and data to be written from the interpreter to the host storage driver for storage in one portion of the host storage disk. In addition, the redundant disk system receives associated computer write requests and data to be written from at least one other computer connected to the network and sends them to the host storage driver for storage in another portion of the host storage disk.

In another aspect, the invention features, in general, a computer system including a plurality of desk top computers that are connected to a network. The computers each have a redundant disk system as has already been described. One portion of the host storage disk of each computer is used for that computer's data, and another portion of the disk is used to store data from another computer connected to the network.

In another aspect, the invention features, in general, a computer implemented method of providing redundant storage for computer data of a plurality of computers connected to a network. An interpreter on each computer maps logical user write requests to physical block level write requests. A redundant disk system on each computer has a disk driver interface to the interpreter and a remote procedure call interface to at least one other computer connected to the network. The redundant disk system sends the write requests and data to be written to a host storage driver for writing on a host storage disk and to at least one of the other computers.

In another aspect, the invention features, in general, a computer program that resides on a computer-readable medium and includes instructions causing the computer to create a redundant disk system as has already been described.

Certain implementations of the invention may include one or more of the following features. In certain implementations: the redundant disk system includes a redundant disk driver and a remote disk system, the redundant disk driver providing the disk driver interface and also having an operating system device driver application programming interface to the remote disk system, the remote disk system being implemented in the user space of the computer and communicating with at least one other computer connected to the network.

Embodiments of the invention may have one or more of the following advantages. Redundant storage is provided for a computer without the need to add hardware or backup software. The approach is portable across different vendors' implementations of an operating system and different operating systems.

Other advantages and features of the invention will be apparent from the following description of a preferred embodiment thereof and from the claims.

DESCRIPTION OF THE PREFERRED EMBODIMENTS

Figure 1:
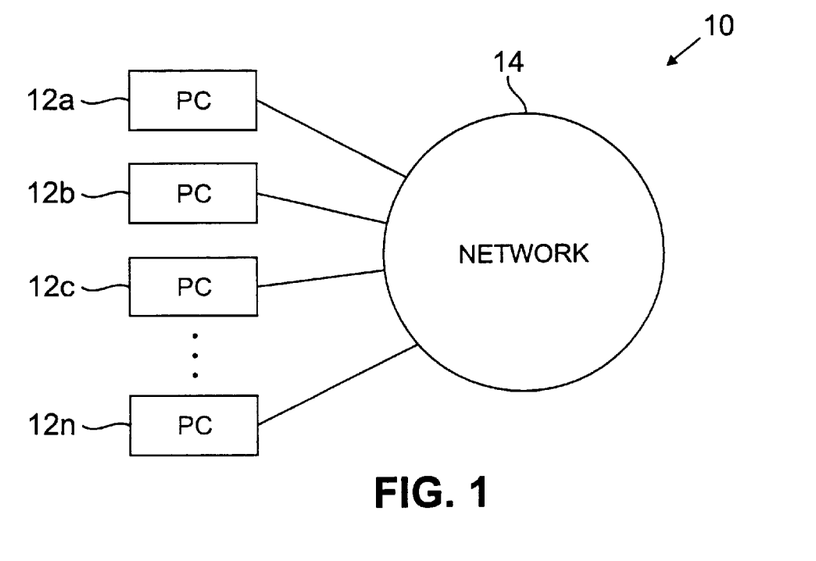
FIG. 1 is a block diagram of system for providing redundant storage of data on a plurality of computers connected to a network.

Referring to FIG. 1, there is shown networked computer system 10. It includes a large number of desktop or other computers 12a–n all connected over network 14, which can be a local area or wide area network.

Figure 2:
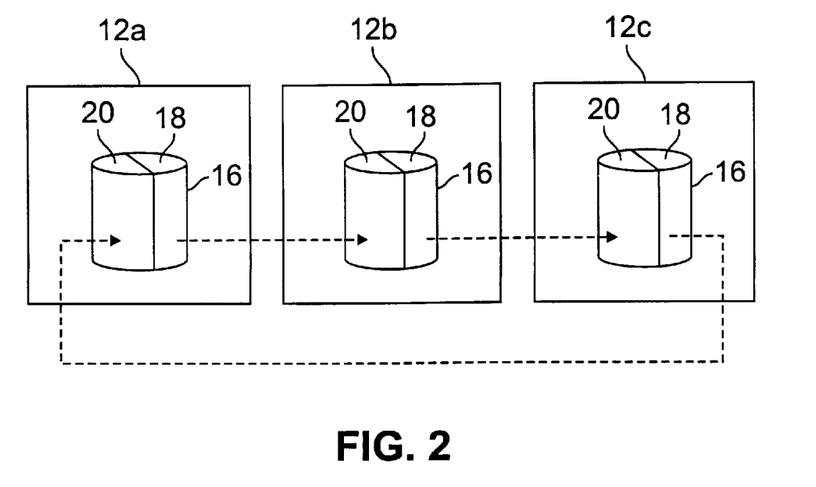
FIG. 2 is a diagram illustrating redundant storage for computers of the FIG. 1 system.

In the simplified three-computer example shown in FIG. 2, each computer 12a, 12b, 12c includes a host storage disk 16 shown divided into two portions 18, 20 in FIG. 2. Portion 18 is used to store host computer data for the particular computer 12a, 12b, or 12c in which it resides, and portion 20 is used to store redundant data from an associated computer. Thus, computer data for computer 12a is stored on portion 18 in computer 12a, and a duplicate copy, i.e., a mirror, is stored on portion 20 of computer 12b, which is connected to computer 12a over network 14. Computer data for computer 12b is stored on portion 18 in computer 12b, and a duplicate copy is stored on portion 20 of computer 12c. Computer data for computer 12c is stored on portion 18 in computer 12c, and a duplicate copy is stored on portion 20 of computer 12a.

Figure 3:
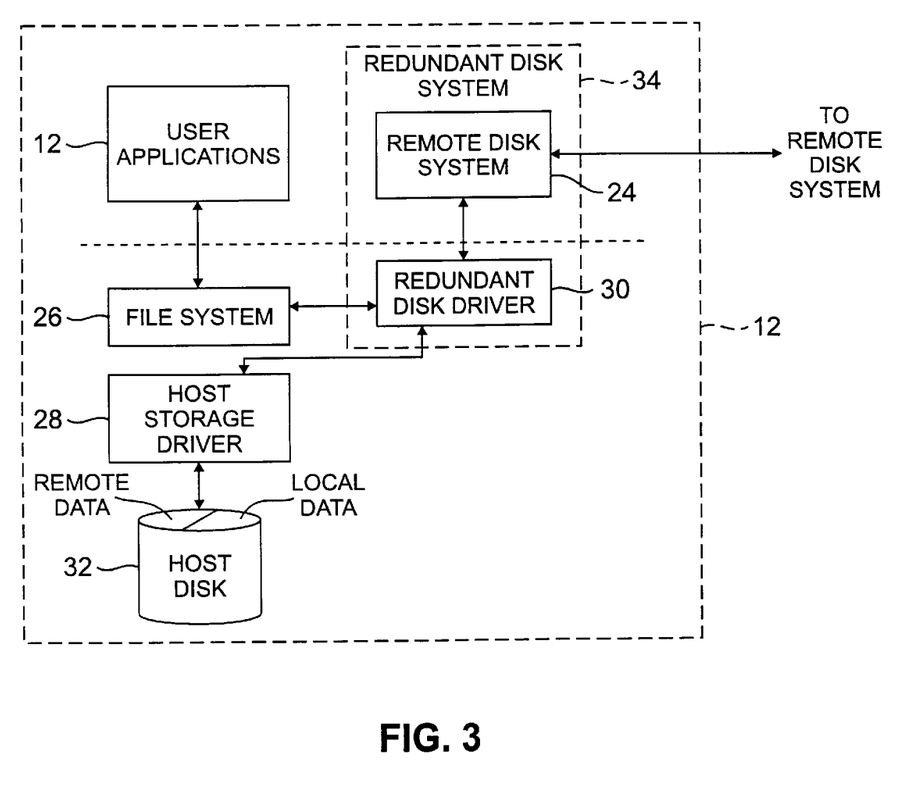
FIG. 3 is a diagram of a computer of the FIG. 1 system.

Referring to FIG. 3, each computer 12 includes user applications 22 and remote disk system 24 in the user application space of the computer. Each computer 12 also includes file system 26 (e.g., the file system present in a UNIX operating system), host storage driver 28, and redundant disk driver 30 in the kernel space of the computer, and host storage disk 32. Host storage driver 28 generates disk control signals to write blocks of data to disk 32 in response to block level write requests. Remote disk system 24 is connected to communicate with one or more other computers 12 over network 14. Redundant disk driver 30 and remote disk system 24 together make up redundant disk system 34.

File system 26, host storage driver 28, and host disk 32 are common components of a computer. File system 26 and host storage driver 28 are provided in the operating system of the computer, and disk 32 is the physical medium on which the data are actually stored. A "block" of data (which might be 512 or 1K bytes or larger depending on the computer and the media type) is the smallest set of data that can be accessed on the physical media (e.g., disk 32). File system 26 carries out a logical to physical mapping; given a file name, it accesses file tables to determine where the file is physically located and converts the file name to a set of physical blocks. The file tables, which are stored along with actual data on disk 32, identify, for each file name, the starting block and the number of blocks in the file.

Figure 4A:
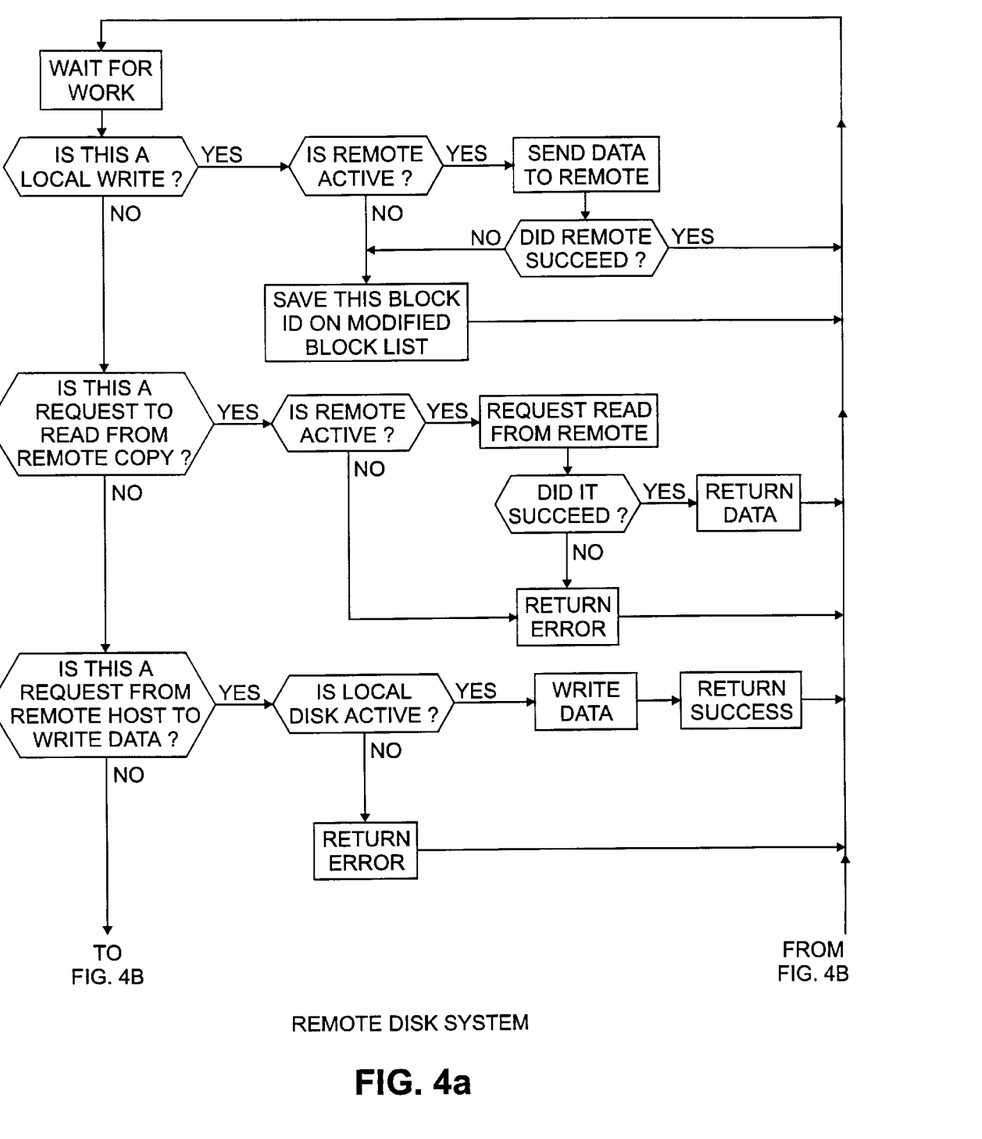
FIGS. 4A–4B are a flow chart showing the steps employed by a remote disk system of a FIG. 3 computer.
Figure 4B:
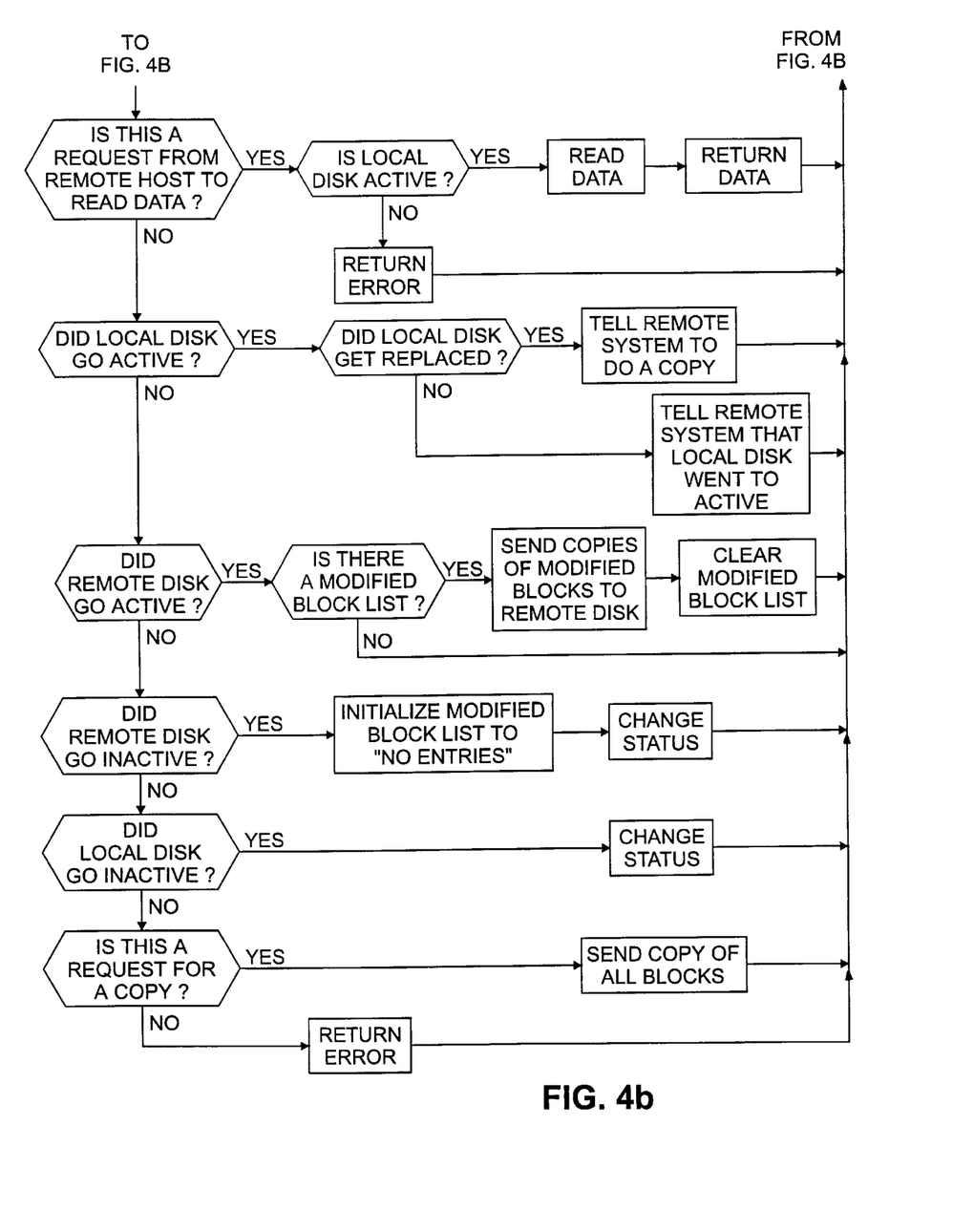

Remote disk system 24 processes both read and write requests. FIGS. 4A–4B are a flow chart showing the steps employed by remote disk system 24. Remote disk system 24 has a remote procedure call interface for receiving computer data from another computer 12 and for transmitting its host computer data to another computer 12, as illustrated in FIG. 2.

Figure 5A:
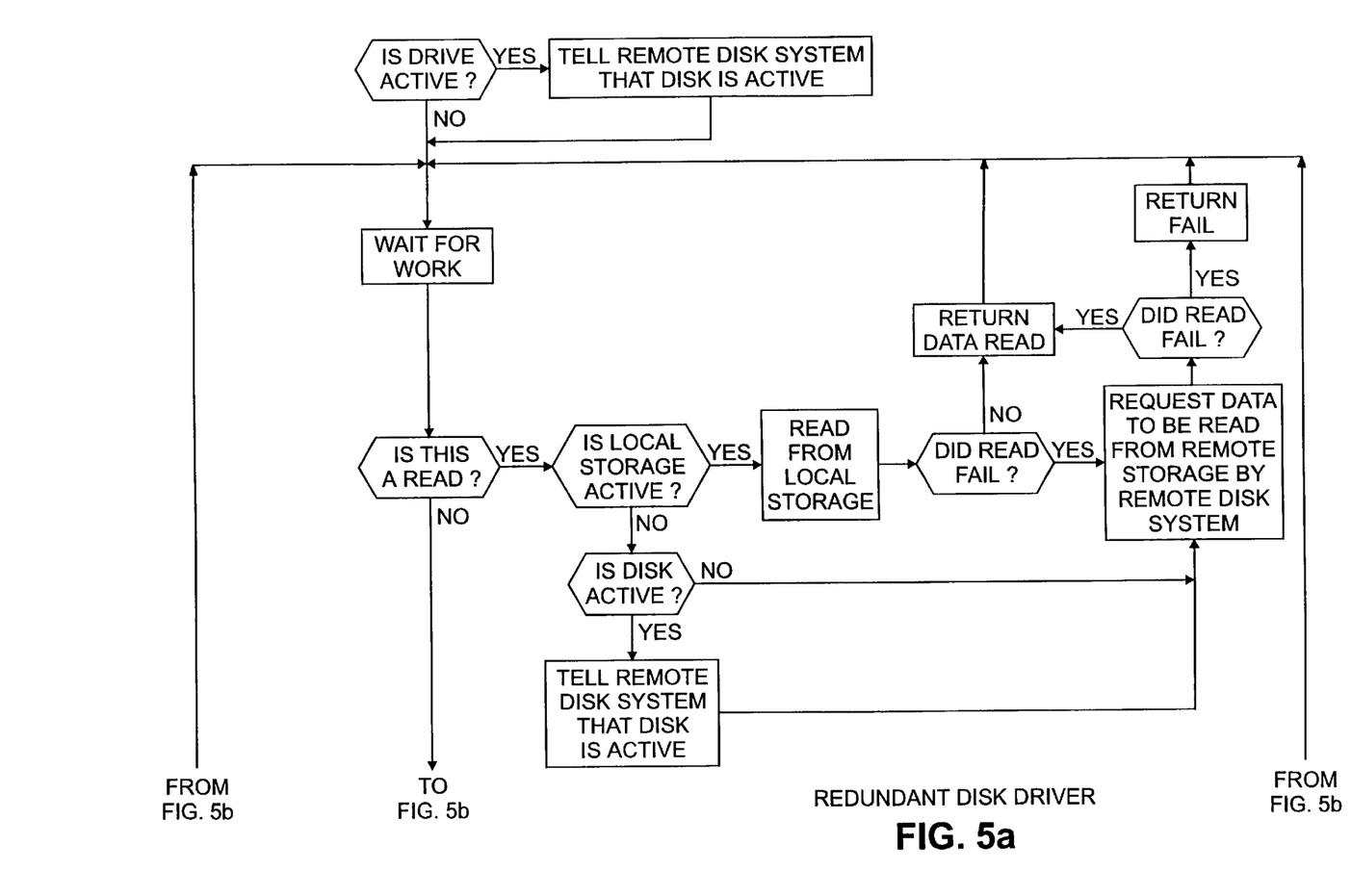
FIGS. 5A–5B are a flow chart showing the steps employed by a redundant disk driver of the FIG. 3 computer.
Figure 5B:
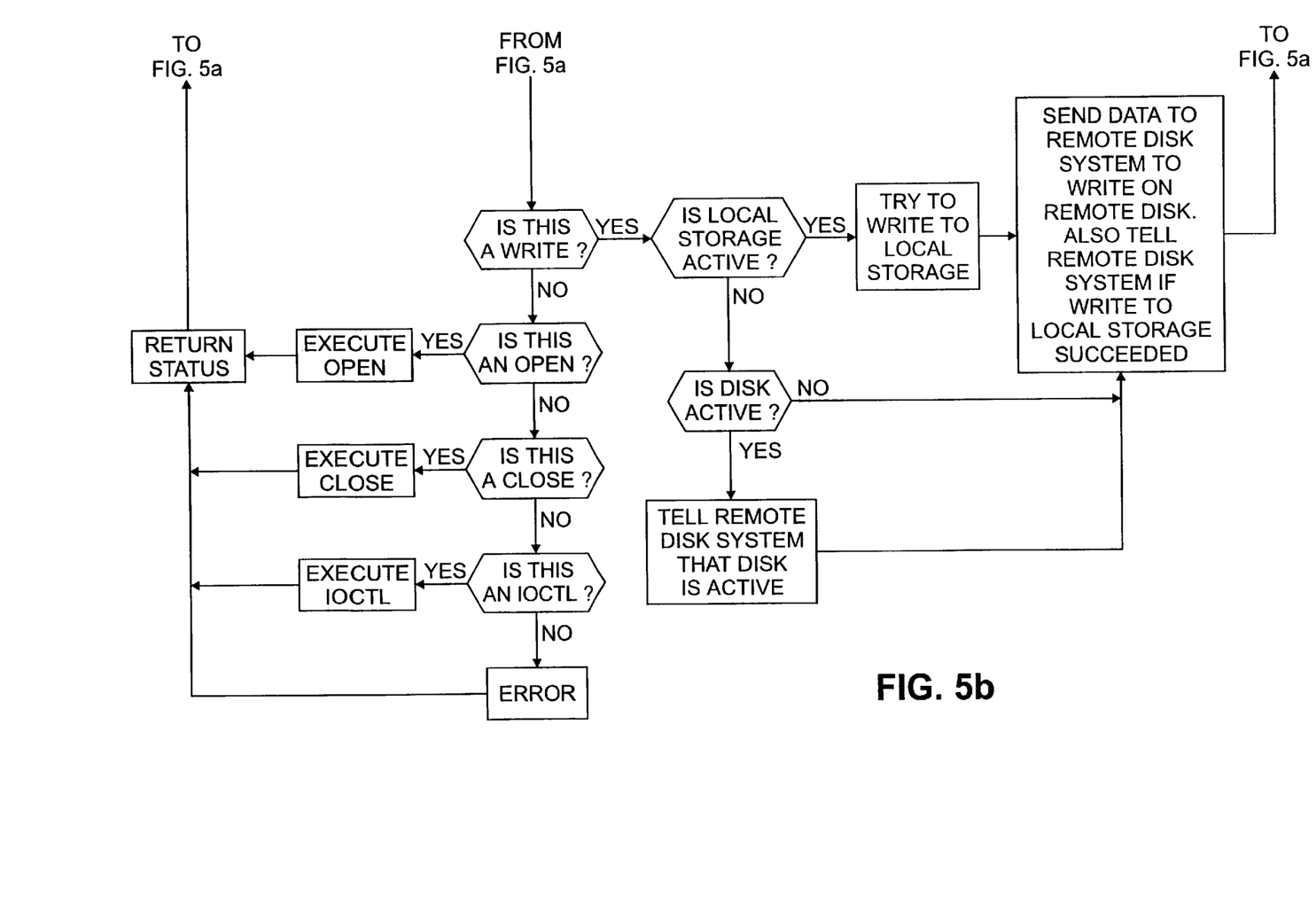

Redundant disk driver 30 has a disk driver interface to file system 26, and looks like a disk driver to file system 26, but it functions to make a copy of all data being written to host storage driver 28 and to transfer that copy to remote disk system 24 for updating a mirror image in a different computer 12. In addition, redundant disk driver 30 functions to transfer data from another computer 12 for storage in its disk 32. Redundant disk driver 30 has an operating system device driver application programming interface to remote disk system 24. In a Unix operating system environment, remote disk system 24 and redundant disk driver 30 can communicate via input output control ("IOCTL") messages, which have the following format: (operation, address of a given buffer, optional arguments). FIGS. 5A–5B are a flow chart showing the steps employed by redundant disk driver 30. When first started up, remote disk system 24 makes an IOCTL call to redundant disk driver 30; there would initially not be a return of the call, because there would not be any copied data to process. When there are copied data to process, the IOCTL call is returned by redundant disk driver 30, and remote disk system 24 looks at the return values of the IOCTL, which specify whether the operation is a read (i.e., transfer from remote disk system 24 to redundant disk driver 30) or write (i.e., transfer from redundant disk driver 30 to remote disk system 24), and the starting block number, and the number of blocks. For a write, the return includes the data being written. Remote disk system 24 then sends another IOCTL call and waits for redundant disk driver 30 to send the IOCTL return when there are more copied data for processing. If data arrive from another computer 12, then the IOCTL message from remote disk system 24 to redundant disk driver 30 includes the data being read by redundant disk driver 30.

In operation, read operations from disk 32 are handled in the normal course without copying of information. When writing, file system 26 communicates with redundant disk driver 30 to write the data beginning at a starting block and continuing for a number of blocks as if redundant disk driver 30 were a conventional host storage driver. Redundant disk driver 30 then passes the information on the starting block and number of blocks to host storage driver 28 and to remote disk system 24. The actual data are copied by redundant disk driver 30 and passed to both host storage driver 28, for storage on disk 32, and to remote disk system 24, for storage at an associated computer 12. The associated computer 12 receives the redundant data at its remote disk system 24 and transfers it to its redundant disk driver 30 and host storage driver 28 for storing on a different portion of its host disk 32 than the portion used for computer data of that computer 12.

When a disk drive fails on a computer 12, there are two failures that are noticed in the mirrored system. The first failure is that the local storage no longer exists for the computer 12 with the failed disk 32. In this case, redundant disk driver 30 will redirect all reads and writes to the associated computer 12 that has been keeping a mirror of the data. All input/outputs will now be satisfied from the mirrored copy on the remote disk 32. When a new disk 32 is installed and detected on computer 12, a copy of the information stored on the remote disk 32 will be copied to the new disk 32. While this is occurring, all inputs/outputs are still satisfied from the remote disk 32. As data are copied to the new local disk 32, it can now be used to satisfy inputs/outputs for the local computer 12. After both the local data and mirrored data are synchronized, normal mirror operations will take over.

The second failure that is noticed is that remote storage no longer exists for data being mirrored from another computer 12. The computer 12 that was sending the mirror data will get a failed write error when it tries to send more data. At that point, it does not know if the failed write was caused by the loss of the network connection (which could simply result from powering off the computer 12 used as a mirror) or whether the mirrored disk has failed. In this mode, as each of the blocks of data is modified, its block ID will be added to a list of changed data. When the mirror comes back on line, it will either issue a request for an update or a complete copy. If the request is for an update, then only the blocks that have changed will be sent to the mirror. If the request is for a copy, then the list of changed blocks will be deleted, and a complete copy of the disk will be sent.

This mirroring scheme avoids the need for additional hardware at the individual computers. Such mirroring can be classified as a redundant array of inexpensive disks (RAID) type I. The use of redundant disk driver 30 makes the approach portable across different vendors' implementations of an operating system and also across different operating systems.

Other Embodiments

Other embodiments of the invention are within the scope of the appended claims. E.g., in a computer where a user application 22 is a database server application that does logical to physical mapping on a so-called raw partition that bypasses file system 26, redundant disk driver 30 would communicate directly with the database server application 22. In this case the database server application 22 would be considered the interpreter.

What is claimed is:

1. A host computer having capabilities for redundant storage of computer data, said computer having a user application space and a kernel space, said computer comprising an interpreter that maps logical user write requests to physical block level write requests, a host storage driver having a disk driver interface for receiving block level write requests, said host storage driver generating disk control signals to write blocks of data to disk in response to block level write requests, said host storage driver being located in said kernel space of said computer, a host storage disk connected to be exclusively controlled by said disk control signals of said host storage driver, and a redundant disk system having a redundant disk driver located in said kernel space of said computer providing a disk driver interface to said interpreter, said redundant disk system also having a remote procedure call interface to one or more associated computers connected to said host computer over a network, said redundant disk system sending host computer write requests and host computer data to be written from said interpreter to said host storage driver via said redundant disk driver and to at least one of said one or more associated computers via said remote procedure call interface.

2. The host computer of claim 1 wherein one portion of said host storage disk is used to store said host computer data in response to write requests from said interpreter, and another portion of said host storage disk is used to store associated computer data from at least one of said one or more associated computers, and wherein said redundant disk system sends write requests and data to be written from said interpreter to said host storage driver for storage in said one portion of said host storage disk, and said redundant disk system receives associated computer write requests and data to be written from at least one of said one or more associated computers and sends said associated computer write requests and associated computer data to said host storage driver for storage in said another portion of said host storage disk.

3. A host computer having capabilities for redundant storage of computer data, said computer having a user application space and a kernel space, said computer comprising an interpreter that maps logical user write requests to physical block level write requests, a host storage driver having a disk driver interface for receiving block level write requests, said host storage driver generating disk control signals to write blocks of data to disk in response to block level write requests, said host storage driver being located in said kernel space of said computer, a host storage disk connected to be exclusively controlled by said disk control signals of said host storage driver, and a redundant disk system having a redundant disk driver located in said kernel space of said computer providing a disk driver interface to said interpreter, said redundant disk system also having a remote procedure call interface to one or more associated computers connected to said host computer over a network, said redundant disk system sending write requests and data to be written from said interpreter via said redundant disk driver to said host storage driver for storage in one portion of said host storage disk, said redundant disk system receiving associated computer write requests and data to be written from at least one of said one or more associated computers via said remote procedure call interface and sending said associated computer write requests and associated computer data via said redundant disk driver to said host storage driver for storage on another portion of said host storage disk.

4. The computer of claim 1, 2 or 3 wherein said interpreter comprises a file system of an operating system of said computer.

5. The computer of claim 1, 2 or 3 wherein said interpreter comprises a database server application.

6. The computer of claim 1, 2 or 3 wherein said redundant disk system includes a remote disk system, said redundant disk driver also having an operating system device driver application programming interface to said remote disk system, said remote disk system being implemented in the user space of said computer and communicating with at least one of said one or more associated computers.

7. A computer system having distributed redundant storage of computer data comprising a network, and a plurality of computers that are connected to said network, each said computer having a user application space and a kernel space, each said computer comprising an interpreter that maps logical user write requests to physical block level write requests, a host storage driver having a disk driver interface for receiving block level write requests, said host storage driver generating disk control signals to write blocks of data to disk in response to block level write requests, said host storage driver being located in said kernel space of said computer, a host storage disk connected to be exclusively controlled by said disk control signals of said host storage driver, one portion of said host storage disk being used to store host computer data in response to write requests from said interpreter, and another portion of said host storage disk being used to store associated computer data from at least one other said computer connected to said network, and a redundant disk system having a redundant disk driver located in said kernel space of said computer providing a disk driver interface to said interpreter, said redundant disk system also having a remote procedure call interface to at least one other said computer connected to said network, said redundant disk system sending write requests and data to be written from said interpreter via said redundant disk driver to said host storage driver for storage in said one portion of said host storage disk and to at least one other said computer connected to said network via said remote procedure call interface for storage in said at least one other said computer, said redundant disk system receiving associated computer write requests and data to be written from at least one other said computer connected to said network via said remote procedure call interface and sending said associated computer write requests and associated computer data via said redundant disk driver to said host storage driver for storage on said another portion of said host storage disk.

8. The computer system of claim 7 wherein at least one said interpreter of a said computer comprises a file system of an operating system of said computer.

9. The computer system of claim 7 wherein at least one said interpreter of a said computer comprises a database server application.

10. The computer system of claim 7 wherein said redundant disk system of a said computer includes a remote disk system, said redundant disk driver also having an operating system device driver application programming interface to said remote disk system, said remote disk system being implemented in the user space of said computer and communicating with at least one other computer of said plurality of computers.

11. A computer implemented method of providing redundant storage for computer data of computers connected to a network, each said computer having a user application space and a kernel space, said method comprising mapping logical user write requests to physical block level write requests at interpreters of respective said computers, receiving said physical block level write requests at redundant disk systems of respective said computers having redundant disk drivers located in said kernel space of said computer providing disk driver interfaces to respective said interpreters, said redundant disk systems also having remote procedure call interfaces to other computers on said network, sending said write requests and host computer data to be written from said redundant disk systems via said redundant disk drivers to host storage drivers of respective said computers for writing on portions of respective host storage disks and also sending each write request and data to be written to at least one other computer connected to said network via said remote procedure call interfaces, each said host storage driver being located in said kernel space of a respective said computer, each said host storage disk each being exclusively controlled by a respective host storage driver, and receiving, at said redundant disk systems of at least some computers, associated computer write requests and associated computer data to be written from other said computers connected to said network via said remote procedure call interfaces and sending said associated computer write requests and associated computer data via said redundant disk drivers to respective said host storage drivers for storage on different portions of said host storage disks than the portions used for said host computer data.

12. The method of claim 11 wherein said interpreters of at least some of said computers comprise file systems of operating systems of said computers.

13. The method of claim 11 wherein said interpreters of at least some of said computers comprise database server applications.

14. The method of claim 11 wherein said redundant disk systems of at least some of said computers each includes a remote disk system, said redundant disk driver also having an operating system device driver application programming interface to said remote disk system, said remote disk system being implemented in the user space of said computer and communicating with another said computer.

15. A computer program for implementation on a computer to provide redundant storage of computer data, said computer program residing on a computer-readable medium, said computer having a user application space and a kernel space, said computer comprising an interpreter that maps logical user write requests to physical block level write requests, a host storage driver having a disk driver interface for receiving block level write requests, said host storage driver generating disk control signals to write blocks of data to disk in response to block level write requests, said host storage driver being located in said kernel space of said computer, and a host storage disk connected to be controlled by said disk control signals of said host storage driver, said computer program comprising instructions causing said computer to create a redundant disk system having a redundant disk driver located in said kernel space of said computer providing a disk driver interface to said interpreter, said redundant disk system also having a remote procedure call interface to one or more associated computers connected to said host computer over a network, said redundant disk system sending write requests and data to be written from said interpreter via said redundant disk driver to said host storage driver and to at least one of said one or more associated computers via said remote procedure call interface.

16. The computer program of claim 15 wherein one portion of said host storage disk is used to store said host computer data in response to write requests from said interpreter, and another portion of said host storage disk is used to store associated computer data from at least one of said one or more associated computers, and wherein said redundant disk system sends write requests and data to be written from said interpreter to said host storage driver for storage in said one portion of said host storage disk, and said redundant disk system receives associated computer write requests and data to be written from at least one of said one or more associated computers and sands said associated computer write requests and associated computer data to said host storage driver for storage on said another portion of said host storage disk.

17. The computer program of claim 15 wherein said redundant disk system includes a remote disk system, said redundant disk driver also having an operating system device driver application programming interface to said remote disk system, said remote disk system being implemented in the user space of said computer and communicating with at least one of said one or more associated computers.

* * * * *